United States Patent
Somes et al.

(10) Patent No.: US 9,628,566 B2
(45) Date of Patent: Apr. 18, 2017

(54) COMMUNICATION OF DATA OF A WEB REAL-TIME COMMUNICATION VIA A CARRIER-GRADE ENVIRONMENT

(71) Applicant: Verizon Patent and Licensing Inc., Basking Ridge, NJ (US)

(72) Inventors: Brian Somes, Richardson, TX (US); Heath W. Hendrickson, McKinney, TX (US); Jeffrey A. Haltom, Fishers, IN (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 382 days.

(21) Appl. No.: 14/054,140

(22) Filed: Oct. 15, 2013

(65) Prior Publication Data
US 2015/0106528 A1    Apr. 16, 2015

(51) Int. Cl.
| | |
|---|---|
| *G06F 15/16* | (2006.01) |
| *H04B 1/56* | (2006.01) |
| *G06F 3/00* | (2006.01) |
| *H04L 9/32* | (2006.01) |
| *H04L 29/08* | (2006.01) |
| *H04L 29/06* | (2006.01) |

(52) U.S. Cl.
CPC ............ *H04L 67/141* (2013.01); *H04L 65/00* (2013.01); *H04L 67/02* (2013.01)

(58) Field of Classification Search
CPC . H04L 65/608; H04L 29/12433; H04L 65/00; H04L 65/1033; H04L 2012/5618; H04N 21/6437
USPC .......................................................... 709/228
See application file for complete search history.

(56) References Cited

U.S. PATENT DOCUMENTS

| | | | | |
|---|---|---|---|---|
| 2004/0202303 | A1* | 10/2004 | Costa-Requena | H04M 3/56 379/205.01 |
| 2005/0250481 | A1* | 11/2005 | Kiss | H04L 12/581 455/414.1 |
| 2007/0249379 | A1* | 10/2007 | Bantukul | H04W 4/12 455/466 |
| 2009/0016377 | A1* | 1/2009 | Dahlen | H04L 41/5058 370/467 |
| 2010/0046726 | A1* | 2/2010 | Yang | H04M 3/42042 379/142.04 |
| 2010/0306547 | A1* | 12/2010 | Fallows | G06F 21/305 713/178 |
| 2011/0149948 | A1* | 6/2011 | Johnston | H04L 65/1063 370/352 |

(Continued)

OTHER PUBLICATIONS

WebRTC description dated May 2011 [last updated Feb. 17, 2016] at URL https://en.wikipedia.org/wiki/WebRTC, attached.*

*Primary Examiner* — Phuoc Nguyen
*Assistant Examiner* — Kishin G Belani

(57) ABSTRACT

A method, a device, and a non-transitory storage medium having instructions to establish a web connection with a user device and provide access to a carrier-grade network in support of a Web Real Time Communication (WebRTC) session; obtain service data that includes data pertaining to a user of the user device; assign a level of trustworthiness to the service data; generate a message, wherein the message includes a request to initiate the WebRTC session; package the service data in the message based on the level of trustworthiness; and transmit the message to another device.

25 Claims, 8 Drawing Sheets

(56) References Cited

U.S. PATENT DOCUMENTS

| | | | | |
|---|---|---|---|---|
| 2011/0161441 A1* | 6/2011 | Haruna | ................... | H04L 51/28 |
| | | | | 709/206 |
| 2013/0058262 A1* | 3/2013 | Parreira | .............. | G06F 17/2247 |
| | | | | 370/276 |
| 2013/0332857 A1* | 12/2013 | Kim | ...................... | H04L 65/403 |
| | | | | 715/753 |
| 2014/0259127 A1* | 9/2014 | Shaw | .................. | H04L 63/0884 |
| | | | | 726/5 |
| 2015/0003297 A1* | 1/2015 | Hancock | ............ | H04L 65/1069 |
| | | | | 370/259 |

\* cited by examiner

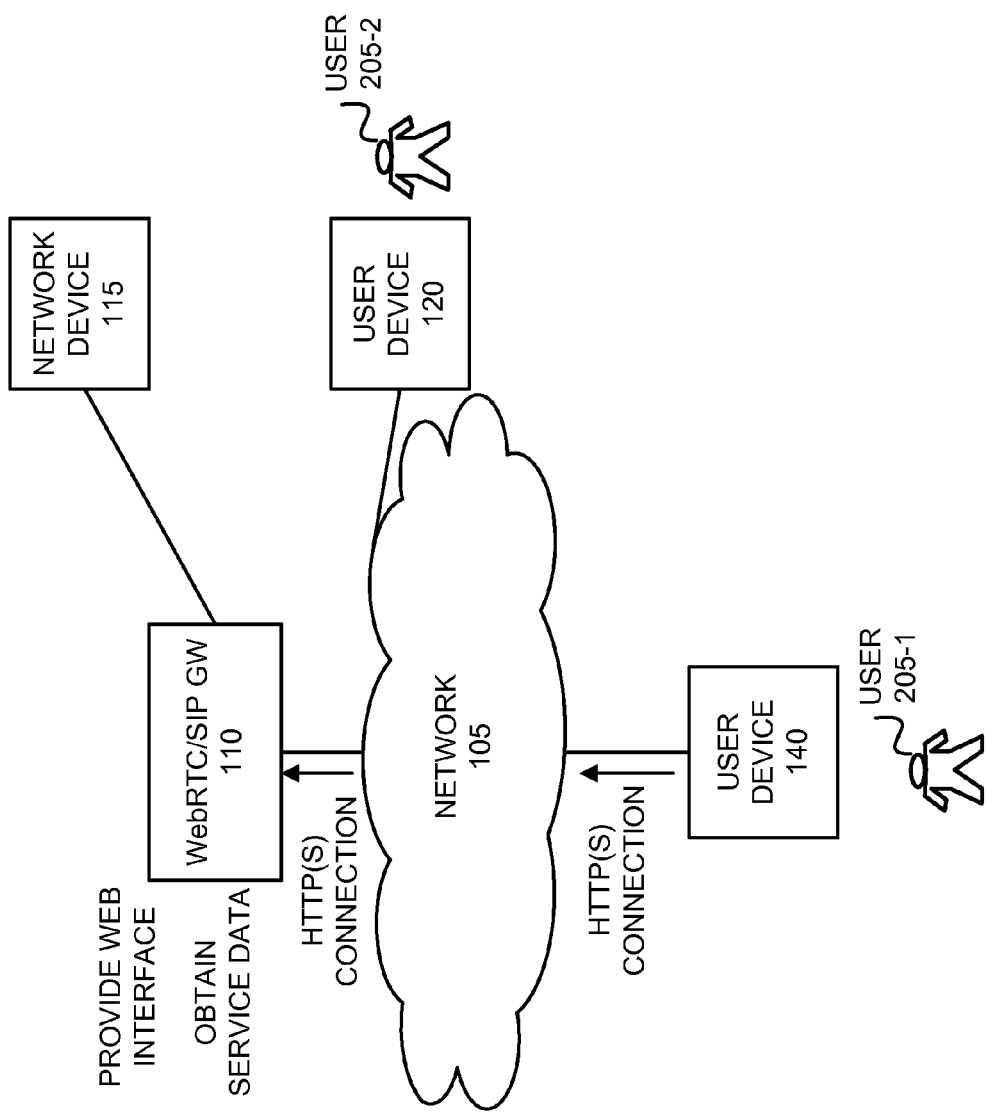

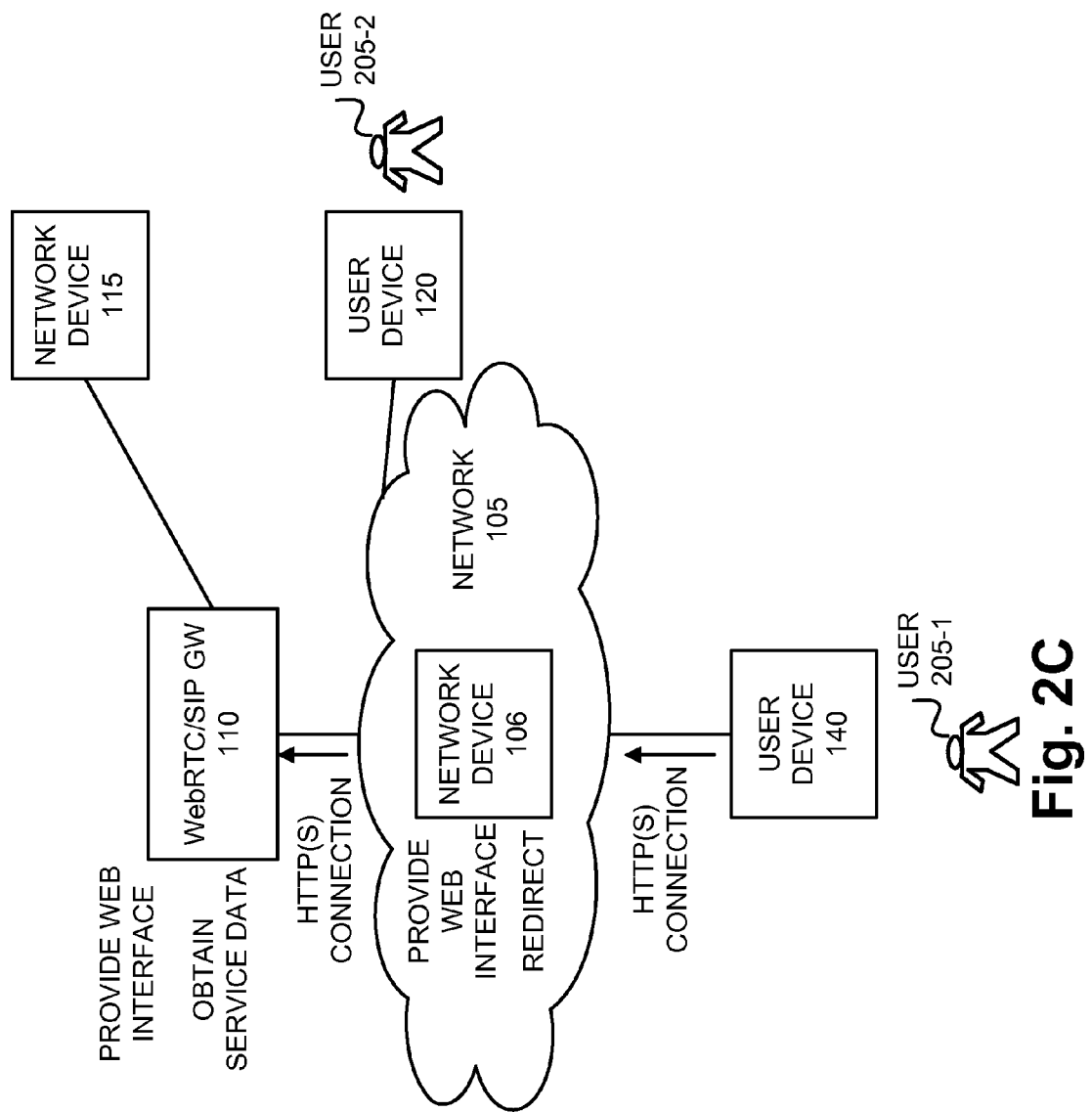

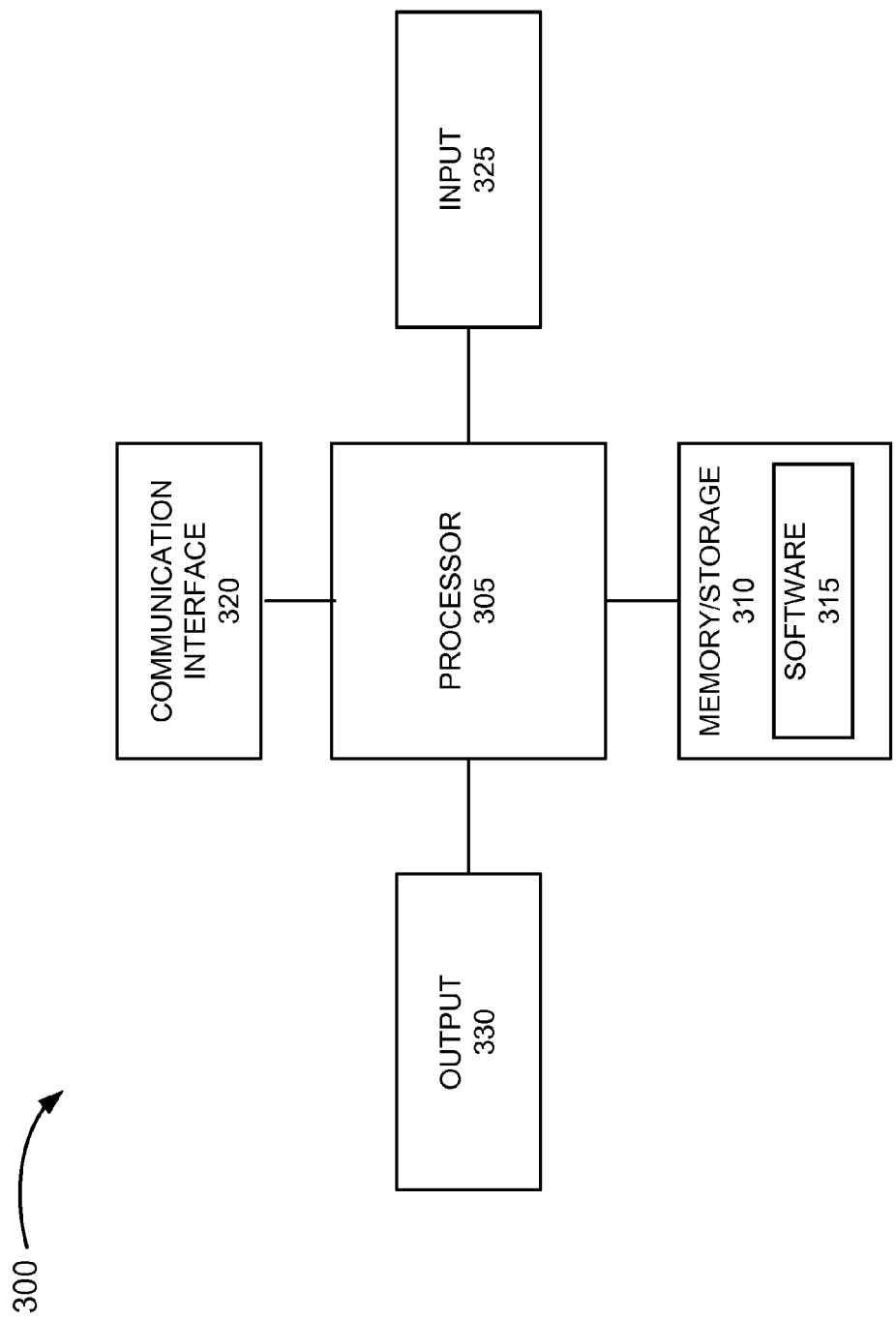

COMMUNICATION OF DATA OF A WEB REAL-TIME COMMUNICATION VIA A CARRIER-GRADE ENVIRONMENT

BACKGROUND

Web Real-Time Communication (WebRTC) has recently been added to HyperText Markup Language (HTML) standards (i.e., HTML 5) and is being supported in the latest Web browsers. WebRTC enables browser-to-browser applications for voice calling, video chat, and peer-to-peer file sharing without plug-ins.

BRIEF DESCRIPTION OF THE DRAWINGS

FIGS. 2A-2D are diagrams that illustrate exemplary processes pertaining to the communication of service data in a carrier-grade network pertaining to a WebRTC session;

FIG. 3 is a diagram illustrating exemplary components of a device that may correspond to one or more of the devices in the exemplary environment.

DETAILED DESCRIPTION OF PREFERRED EMBODIMENTS

Figure 1:
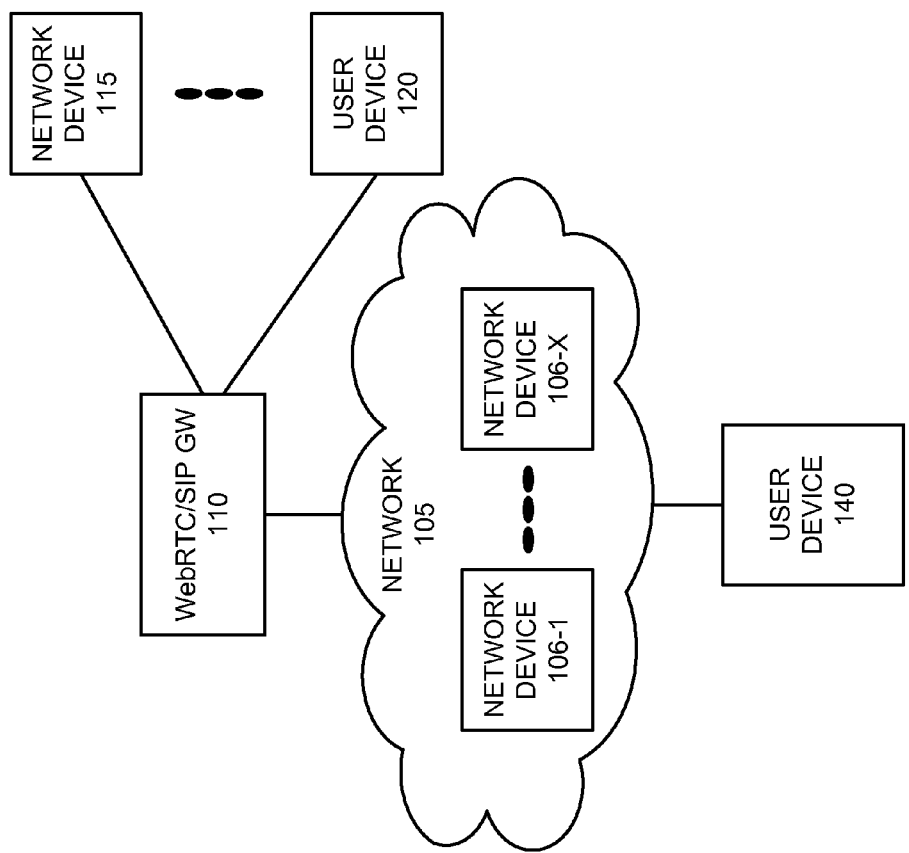
FIG. 1 is a diagram illustrating an exemplary environment in which exemplary embodiments may be implemented.

The following detailed description refers to the accompanying drawings. The same reference numbers in different drawings may identify the same or similar elements. Also, the following detailed description does not limit the invention.

With the advent of WebRTC and HTML 5, Internet users will be provided with native browser mechanisms for setting up media sessions. Prior to the widespread use of WebRTC-enabled browsers, plug-ins will allow users of older browsers to run WebRTC applications. As more users upgrade to the latest web browsers and WebRTC becomes ubiquitous, organizations will be able to leverage this capability to offer significantly enhanced and customized contact services. By way of example, an organization may provide a link to a website to allow prospective employees, students, contestants, etc., to easily join a bridge to be interviewed by different people anywhere in the organization, or across the country or the world. By way of another example, an insurance company that offers a "nurse line" type service to their corporate customers could enhance the experience by allowing employees to speak face to face with their health guidance expert, via a login through their existing benefits website. Similarly, a property insurer could set up a claims service in which an insured, an adjuster, and a claims specialist, whom are all remotely located, could look at and discuss a claim (e.g., for damage) in real time. According to another example, an enhanced help-line type service could be made available for technicians, installers, or repair personnel to provide visual confirmation of an issue or a problem. The technicians, installers, or repair personnel, in turn, may receive better and/or faster solutions from a technical assistance center. Similarly, a retail purchaser of a product could be given a "video helpline" link for addressing computer issues ranging from product assembly help to fashion advice. According to yet another example, a news outlet could provide a link to a website for their reporters, registered users, or even the general public to become instant weather, news, and/or traffic "reporters." This would allow the news outlet to quickly obtain live video from the field and from a myriad of user devices and perspectives. Field "reporters" could be connected (e.g., a conference) to a station's (e.g., television, radio, etc.) bridge for live interviews. According to still another example, many financial service providers assign teams of advisors to support clients, as well as host seminars on specific investment topics. A financial institution could offer clients the ability to easily access and bridge with financial experts. This could be accomplished by allowing a client to reserve time online from within their account, or register for a particular seminar via a link to a web service, via an email campaign, etc. According to another example, WebRTC could be used as a potential Internet access standard for government agencies, police, fire, video/bridged 911, etc., to support a video bridging service of the agent's calls with a team or communication center.

While the above exemplary services can be enabled using WebRTC, as well as others not specifically mentioned, there are some deficiencies that exist when a WebRTC service is integrated into a carrier-grade network. For example, one deficiency is the inability to identify the "anonymous" Internet user, along with any information (e.g., environment information, language, etc.) gathered by a device (e.g., a web server) that the "anonymous" user may access. Another deficiency, for example, includes applying a privacy setting (e.g., none, medical, financial, etc.) to a WebRTC session. As a consequence of these deficiencies, as well as others described herein, a carrier-grade network and/or a device (e.g., a downstream device) may not use a type of information for a beneficial purpose.

According to an exemplary embodiment, a network device provides access to a carrier network for WebRTC sessions. The network device obtains data. For the sake of description, this data is referred to as "service data," examples of which are described herein. The network device inserts the service data into an appropriate field of a message pertaining to a media session of the WebRTC. Given the prevalent usage of the Session Initiation Protocol (SIP), exemplary embodiments of the network device include the use of the SIP for messaging of the media session. However, embodiments described herein may be implemented using other suitable protocols (e.g., Extensible Messaging and Presence Protocol (XMPP), H.323, etc.), which may not be specifically described. Additionally, while exemplary embodiments of the network device are described as including a gateway device, according to other embodiments, the network device may be implemented to include a different type of network device (e.g., a server device, etc.), in addition to or instead of a gateway device.

According to an exemplary embodiment, the network device is implemented as a WebRTC-to-SIP gateway device. According to an exemplary embodiment, the WebRTC/SIP gateway device obtains service data, examples of which are described herein. The WebRTC/SIP gateway device generates a SIP message. According to an exemplary embodiment, the WebRTC/SIP gateway device selects the appropriate field (e.g., a SIP header) to include the service data. According to an exemplary embodiment, the WebRTC/SIP gateway device selects the appropriate field based on regulatory considerations (e.g., Federal Communications Commission (FCC) considerations), levels of trustworthiness of the service data, and/or other factors. Due to the potentially sensitive nature of the service data, according to an exemplary embodiment, the WebRTC/SIP gateway device tokenizes the service data so that the service data is not human readable (e.g., as text) in the SIP message (e.g., a SIP signaling message) except to authorized users and/or devices. According to an exemplary embodiment, the WebRTC/SIP gateway device transmits the SIP message to another SIP device, which may be an intermediary device or an end device pertaining to a WebRTC session.

According to an exemplary embodiment, different types of service data are packaged into specific SIP headers. For example, the Automatic Number Identification (ANI)/Name and Number and user presentation restriction (e.g., privacy) information is packaged in the P-Asserted-Identity header, the Remote-Party-Id header, the Privacy header, and/or the From header. The "DNIS-like" service data (e.g., a web service/site the WebRTC user may visit just prior to connecting to WebRTC/SIP gateway device) is packaged in the Call-Info header. Additionally, for example, any remaining service data (e.g., additional WebRTC user identifier, trust levels, individual data element privacies, user language, country, software version, employee id, service party level, etc.) is packaged in the User-Agent header.

In view of the foregoing, the WebRTC/SIP gateway device may bridge the gap (e.g., using a secure means of communications) between the anonymous user's data service (i.e., WebRTC session) and a carrier network, thus allowing a more "carrier grade" level of service experience to be implemented, yet still providing a way for anyone, regardless of location, to reach a SIP-based carrier's destinations and/or services. From the perspective of a carrier grade WebRTC service provider, an Internet user may be considered a temporary or an ephemeral subscriber, without the expense of requiring the infrastructure and management (e.g., an IP Multimedia Subsystem (IMS) network) typically involved with supporting or owning a subscriber. Additionally, the service data may be used to provide more robust services that benefit the user, the carrier, and/or a third party. By way of example, the carrier WebRTC service provider may use the service data for statistical purposes, targeted advertising, etc.

Service data may include one or multiple types of data. For example, one type of service data may pertain to the user, another type of service data may pertain to the user device of the user, yet another type of service data may pertain to another network device and/or a network, and still another type of service data may pertain to a WebRTC session setting. While these types of service data are exemplary and are not intended to be exhaustive, the acquisition and use of various types of service data may depend on various factors, such as, for example, the type of WebRTC session (e.g., video and audio, a telephone call, etc.), whether the user has an account with a service provider (e.g., a web service provider, a WebRTC service provider, etc.), whether the user is prompted to provide service data, and the other party involved in the WebRTC session. The service data may include data previously stored prior to an initiation of a WebRTC session, data obtained during the establishment of a WebRTC session, and/or data obtained during the WebRTC session. More specific examples are described below.

As previously described, service data may include various types of data. While the specific instances of service data may be incorporated into an embodiment, the specific instances described are not intended to be exhaustive. For example, the service data may include an indicator of web service verification (e.g., a type of a method of "authentication" of a user). By way of further example, the service data may indicate that no verification has taken place or that the user has a registered and authenticated relationship with a website (e.g., login pass, credentials) which may be tied to various data. For example, the various data may include personal information (e.g., name, address, telephone number, e-mail address, etc.), financial information (e.g., credit card information, etc.), and/or other types of information obtained as a result of the user having the relationship with the website. Alternatively, the service data may indicate that the user has a casual account (e.g., login pass is tied to the user's name and unverified information provided by the user), a temporary authenticated account (e.g., no stored account relationship, but verification of service data in real-time, such as name, credit card number, etc.), or other forms of verifications, such as the user being invited via email or other interaction in which the user is "known" by business affiliation and the user receives instructions and a pass-code to log in or join a WebRTC session.

The service data may include data indicating an operating system (e.g., Windows® operating system (e.g., Windows 8, etc.)) pertaining to the user device of the user, the web browser being used (e.g., Internet Explorer® browser, Mozilla Firefox® browser, etc.), and the version of the web browser. In current implementations, this information is being used to determine if a plug-in needs to be pushed to the user device to enable the browser to be used to participate in a WebRTC session. Additionally, for example, by extending the SIP signaling to carry this type of service data may allow carrier-side application to hone their service to the user's environment or to collect data for useful statistical purposes. For example, the recognition of the user's use of a non-WebRTC/HTML5 capable web browser may serve as a trigger to advertise to the user an upgrade to the latest browser that supports WebRTC.

The service data may include data indicating a dialed number identification service (DNIS) of a provider and/or an owner of a web service that the user has visited or connected to use a WebRTC service. This type of service data may be an example of data for providing WebRTC-based DNIS service. That is, the legacy DNIS concept may be re-spun to be the Uniform Resource Identifier (URI) the user used to reach the WebRTC/SIP gateway device directly, or the URI used to reach the WebRTC/SIP gateway indirectly (e.g., via a web service). In turn, a given service may be offered or provided based on the URI and means of access (e.g., direct URL, indirect URL). Although a further description of how-and-where service data may be packaged into a SIP message, it is worth noting that this type of service data may be inserted into the SIP message by way of adding an extension to the SIP "Call-Info" header. According to an exemplary embodiment, a new token "DNIS" is proposed, and the URI associated with this token carries the site address and/or link the user accessed to reach the WebRTC service.

Additionally, the service data may include data indicating location data (e.g., city, state, country, address, etc.) pertaining to the user. For example, as previously described, an exemplary WebRTC service, such as the public "news reporter" or video 911/government services may use this type of service data. While some location data may be communicated in a User-Agent header, there may be other SIP headers to use for this purpose, such as the Geolocation header (e.g., Request For Comments (RFC) 6442). The creation of such service data may need to be based on the comfort level at which address coordinates of the location from the given user and/or web service can be trusted. The service data may also include other characteristics attributable to the user, such as, for example, the language of the user, which may be used for enhanced services, statistical purposes, etc.

The service data may include an expectation of privacy indicator. For example, the privacy indicator may indicate a particular level of privacy, which may range from none to an extreme level or some other designation. As an example, the privacy indicator may fall into various categories such as none, medical, governmental, financial, consumer, adult, etc. Some general services that may be offered (e.g., 8XX toll free calls) preclude the expectation of privacy of the calling user's information since the provider or owner of the service is paying for the service. However, there may be potential applications in which privacy of this type of service data may be desirable or mandated. The preservation and communication of privacy of service data and representing the service data appropriately in the SIP message is described further below.

When interacting with the user, there is additional service data, not specifically mentioned, that may be available, and depending on the service, various designations and assignments of privacy may be tailored. Nevertheless, enhanced services may be provided by allowing web services to communicate different levels of privacy for different types of service data.

As evidenced above, service data may correspond to different types of data. The service data may pertain to the user, the user's device, privacy, authentication, etc., and may be collected from various sources (e.g., HTTP(S) messaging, prompts, previously stored, etc.). The service data that is obtained by the WebRTC/SIP gateway may be passed on via a carrier-grade SIP network for subsequent use by various systems, devices, applications, etc. For example, service data may be displayed to an end user, used statistically for marketing and advertisement, used to provide enhanced services, etc.

Although the service data may be expressed in different formats and ways, provided below are exemplary instances of service data.

User and User Equipment Related Data:
  User Language—"Accept-Language: en-us\r\n"
  User Country—"Accept-Language: en-us\r\n"
  Location informatio/Geolocation—latitude: X; longitude: Y
  Authorization—"Authorization: basic Y29uZkBnYnAuY29tOjEyMzQ=\r\n"
  DNIS/originally dialed (typed) accessed webpage URL—"Request URI: http://206.165.51.48:8448/verizonvideo/templates/application-template.html?_=1367946411420"
Webservice Created/Obtained Data:
  Indicator of web service verification—type/method/level of "authentication"
  DNIS of provider/owner of web service which the user has reached service through (i.e. DentalGroupABC.com)
  Expectation of User privacy indicator (as in if this was a phone service app the user could check a box for 'presentation restriction')
  Expectation of Service privacy level
  "Authenticated" user's telephone number
  "Authenticated" user's Company/employee number
  "Authenticated" user's address/location. Other types of service data that has been authenticated may also used.

As described herein, the identification, authentication, and/or privacy may control how an instance of service data is interworked into SIP and making the service data available to other applications in the carrier SIP network.

FIG. 1 is a diagram illustrating an exemplary environment 100 in which exemplary embodiments may be implemented. As illustrated, environment 100 includes a network 105, network devices 106-1 through 106-X (also referred to collectively as network devices 106 and individually as network device 106), a WebRTC/SIP gateway device 110, a network device 115, and a user device 120. Also, environment 100 includes a WebRTC client device 140.

Environment 100 may be implemented to include wired, optical, and/or wireless connections among the devices and the network illustrated. A connection may be direct or indirect and may involve an intermediary device and/or an intermediary network not illustrated in FIG. 1. Additionally, the number and the arrangement of connections between the devices and the network of environment 100 are exemplary.

The number of devices and networks, and the configuration in environment 100 are exemplary. According to other embodiments, environment 100 may include additional devices, fewer devices, different devices, and/or differently arranged devices, than those illustrated in FIG. 1. For example, a single device in FIG. 1 may be implemented as multiple devices and/or multiple devices may be implemented as a single device. By way of further example, WebRTC/SIP gateway device 110 may be implemented as multiple devices. Additionally, or alternatively, environment 100 may not include one or more network devices 106, network device 115, or user device 120.

A device may be implemented according to a centralized computing architecture, a distributed computing architecture, or a cloud computing architecture. Additionally, a device may be implemented according to one or multiple network architectures (e.g., a client device, a server device, a peer device, a proxy device, and/or a cloud device).

According to other embodiments, environment 100 may include additional networks and/or different networks than those illustrated and/or described in reference to FIG. 1. For example, environment 100 may include other types of network(s), such as the Internet, etc. Also, according to other embodiments, one or more functions and/or processes described as being performed by a particular device may be performed by a different device, or some combination of devices.

Network 105 includes an IP-based network. For example, the IP-based network may include the Internet, a private IP network, or a combination thereof. Network 105 may be implemented as a satellite-based network, a terrestrial-based network, or a combination thereof. Network 105 provides access to a WebRTC session.

Each of network devices 106 includes a network device that hosts a web site. For example, the web site may host a service that is financially-related, governmentally-related, consumer-related, medically-related, etc. In the context of a WebRTC session, according to an exemplary scenario, a user may visit network device 106 for some reason. The user may or may not provide service data via network device 106. Thereafter, network device 106 redirects the user to WebRTC/SIP gateway device 110. According to another scenario, a user may visit WebRTC/SIP gateway device 110 and be redirected to network device 106. For example, network device 106 may support a WebRTC session. By way of example, network device 106 may be implemented as a bridge. Other scenarios may be contemplated, in which, for example, the user initially visits one of network devices 106 (e.g., a web site), is redirected to WebRTC/SIP gateway device 110, and then is redirected to another one of network devices 106 (e.g., a bridge hosted by a service provider of the web site). Network device 106 may store address book information to allow the user to establish a WebRTC session with a called party.

WebRTC/SIP gateway device 110 includes a network device that provides a WebRTC service. For example, according to an exemplary embodiment, WebRTC/SIP gateway device 110 obtains or collects service data. According to an exemplary embodiment, WebRTC/SIP gateway device 110 includes an HTML/Hypertext Transfer Protocol (Secure) (HTTP(S)) web service that may interface with a user. By way of example, the user may connect to WebRTC/SIP gateway device 110 to start a WebRTC session. WebRTC/SIP gateway device 110 may obtain service data from the user. For example, WebRTC/SIP gateway device 110 may prompt the user for service data. The user may be, for example, an anonymous user or the user may have an affiliation (e.g., as a customer, a repeat user (which may not constitute a "customer"), etc.) with the WebRTC service provider of WebRTC/SIP gateway device. Accordingly, depending on the user, WebRTC/SIP gateway device 110 may obtain service data using various methods. For example, the user may provide service data via the user interface. Alternatively, via the user interface, the user may provide non-service data that is linked to stored, service data which may be obtained by WebRTC/SIP gateway device 110. For example, a user may enter a pass code obtained from a third party via the user interface. WebRTC/SIP gateway device 110 or another network device (not illustrated) may store service data. WebRTC/SIP gateway device 110 uses the pass code as a key to access and obtain the service data linked to the pass code. As an example, the service data may be stored in a database or any suitable data structure. According to yet another alternative, the user may provide service data via the user interface and WebRTC/SIP gateway device 110 obtains additional service data that is stored (e.g., in the database, etc.).

Additionally, or alternatively, WebRTC/SIP gateway device 110 may obtain service data from user device 140. For example, by virtue of a connection with user device 140, WebRTC/SIP gateway device 110 may receive an HTTP(S) message or other type of message that includes service data. WebRTC/SIP gateway device 110 may identify service data in the message based on the format of the message and service data expected to be contained therein. For example, a WebRTC/SIP service provider may provide a service application or code add-in for use in/by their customers' web services, websites, etc., or internally to the WebRTC/SIP service provider's hosted web services that will allow the Form of Authentication, type of Service, etc. to be communicated in the data fields of the HTTP(S) data fields to be passed to WebRTC/SIP gateway device 110 for subsequent communication over SIP as described herein.

Additionally, or alternatively, WebRTC/SIP gateway device 110 may obtain service data from another network device. For example, if the user is redirected from network device 106 to WebRTC/SIP gateway device 110, WebRTC/SIP gateway device 110 obtains the service data from network device 106 (e.g., in a push or pull method). WebRTC/SIP gateway device 110 may obtain service data included in a URI of the redirect or within a separate message from network device 106.

According to an exemplary embodiment, WebRTC/SIP gateway device 110 inspects the obtained service data and determines which field(s) (e.g., header) or other portion of a SIP message (e.g., payload portion, extension, a new MIME package, etc.) to include the service data. For example, a new MIME package (e.g., name and structure) could be registered and accepted by the Internet Assigned Numbers Authority (IANA) and the Internet Engineering Task Force (IETF) for this purpose.

As previously described, WebRTC/SIP gateway device 110 generates a message (e.g., a SIP message) in response to a message (e.g., an HTTP(S) message) or other activity (e.g., user selection via the user interface). As an example, WebRTC/SIP gateway device 110 may generate a SIP INVITE message or other suitable SIP message to establish, maintain, and/or terminate a WebRTC session. According to an exemplary embodiment, WebRTC/SIP gateway device 110 enhances and extends the use of Calling Party (ANI identification) headers such as the P-Asserted-Identity, Remote-Party-Id, FROM, and Privacy header to carry similarly related service data representing the WebRTC user. The increased ability to properly create and indicate this information (e.g., service data) over SIP networks is further described below. A further description of exemplary portions of the SIP message that may be used to carry service data is provided below.

According to an exemplary embodiment, WebRTC/SIP gateway device 110 extends the use of the User-Agent header of SIP, as defined in RFC-3261, to carry service data of non-SIP-based users. And in turn, the User-Agent header's use is thus specifically extended to represent non-SIP (i.e. WebRTC) user agents as well as traditional SIP clients. Typically, the User-Agent header carries information about a SIP User Agent Client (UAC) that originates a request or a call. The User-Agent header is relatively unstructured and may be modified to carry non-SIP data (i.e., WebRTC based service data).

According to an exemplary embodiment, WebRTC/SIP gateway device 110 extends the use of the Call-Info header of SIP, as defined in RFC 3261, to carry service data. Typically, the Call-Info header includes caller information that is in the form of a URI. As an example, the caller information may indicate a purpose of the URI information, such as an icon (e.g., a link to the caller's picture), information (e.g., a link to the caller's web page), or a card (e.g., a business or a vCard link). Thus, service data that can be represented as a URI may be carried in the Call-Info header. For example, the user may select a web service address or link for establishing a WebRTC session. An example of this type of service data may be represented as: Call-Info: http://www.DentalGroupABC; purpose=DNIS.

According to an exemplary embodiment, WebRTC/SIP gateway device 110 uses a proprietary header to carry service data. However, for such headers to be standardized and useful to many platforms, the header format would have to be proposed, registered, and accepted by the IANA and the IETF. For example, a new SIP header could be implemented as a "WebRTC-info" header to carry service data.

According to an exemplary embodiment, WebRTC/SIP gateway device 110 selects the appropriate portion of the SIP message to carry the service data. For example, WebRTC/SIP gateway device 110 selects an appropriate header to carry the service data based on the type of service data, service data format, etc. According to an exemplary embodiment, WebRTC/SIP gateway device 110 may consider other factors when selecting the portion of the SIP message to carry the service data, such as FCC standards/requirements and trustworthiness, as well as how to send the service data (e.g., send as human-readable text, send as tokenized data for security purposes).

According to an exemplary embodiment, WebRTC/SIP gateway device 110 assigns a level of trustworthiness to each instance or only certain instances of service data. For example, assume that WebRTC/SIP gateway device 110 assigns the level of trustworthiness to an instance of service data based on a three tier system (e.g., low, medium, high). According to other implementations, WebRTC/SIP gateway device 110 may use additional or fewer tiers, as well as a different nomenclature to specify different levels of trustworthiness. According to an exemplary embodiment, WebRTC/SIP gateway device 110 assigns the level of trustworthiness based on a set of network rules and heuristics prescribed by the WebRTC/SIP service provider, examples of which are described below.

According to an exemplary embodiment, WebRTC/SIP gateway device 110 may assign a level of trustworthiness to an instance of service data (e.g., a user's name) based on the source from which the service data is obtained. For example, if WebRTC/SIP gateway device 110 receives the service data (e.g., as a part of a redirect) from a web site that provides a medical service with which the user is seeking treatment or advice, WebRTC/SIP gateway device 110 may ascribe a high level of trustworthiness to the user's name. According to another example, service data may be obtained directly from the user (e.g., a user interface prompting the user for service data). While this manner of obtaining service data alone does not ensure that the service data is credible and can be afforded a high level of trustworthiness, depending on the circumstances, WebRTC/SIP gateway device 110 may apply certain probabilities of veracity. For example, consider a scenario in which the user provides his or her name and other personal information in order to win a contest. Given these circumstances, WebRTC/SIP gateway device 110 may assign a level of trustworthiness as medium or high. Accordingly, as an example, a network heuristic may include a veracity factor that quantifies an expected level of veracity for an instance of service data. Based on the veracity factor, WebRTC/SIP gateway device 110 may assign a level of trustworthiness.

In another example illustrating assignment of trustworthiness, assume that the web site provides WebRTC/SIP gateway device 110 with service data stemming from an account created by the user. For example, the service data may have been verified by a provider when the account is created. Under these circumstances, WebRTC/SIP gateway device 110 may assign a level of trustworthiness as high. WebRTC/SIP gateway device 110 may consider other factors when assigning a level of trustworthiness, such as whether a third party (e.g., the service provider of the web site) is a trusted party versus a party in which no previous relationship exists between the WebRTC/SIP service provider and the web site service provider. In cases when the user has an account with the WebRTC service provider of WebRTC/SIP gateway device 110, WebRTC/SIP gateway device 110 may also assign a level of trustworthiness as high.

According to an exemplary embodiment, WebRTC/SIP gateway device 110 may assign a level of trustworthiness to an instance of service data based on the service data itself. For example, service data pertaining to the user's browser and version, and perhaps language of the user may be afforded a high level of trustworthiness since there may be an assumption that such service data does not inherently offer any reason or benefit for this service data to be false or inaccurate. According to yet another exemplary embodiment, WebRTC/SIP gateway device 110 may not assign a level of trustworthiness to the service data or an instance of service data. For example, WebRTC/SIP gateway device 110 may forego this operation based on the type of service data obtained. By way of further example, the assignment of a level of trustworthiness to an instance of service data (e.g., type of browser, version, language, etc.) may not provide any benefit (e.g., to an end user, another network device, a third party, etc.).

Based on the level of trustworthiness assigned to an instance of service data, WebRTC/SIP gateway device 110 may package the service data in the SIP message in a particular manner, examples of which are described below. For example, assume that a high level of trustworthiness is assigned to an instance of service data (e.g., a user name and telephone number) based on the fact that the user has been authenticated and/or identified, as communicated by the web site. In turn, WebRTC/SIP gateway device 110 may assert the user's identity (telephone number) and display name in the P-Asserted-ID header (see, e.g., RFC 3325) and produce a FROM header (see e.g., RFC 3261) with the "display name" and "userinfo" part based on the service data provided. According to another example, assume that a low level of trustworthiness is assigned to an instance of service data (e.g., a user name and number) based on the absence of authentication and/or verification information provided. In turn, WebRTC/SIP gateway device 110 may assert the user's identity in only a FROM header with the "display name" and the "userinfo" parts based on the service data provided. Since a carrier must not assert the identity of the user (i.e., send in P-Asserted-ID) unless the carrier is certain of the user's identity (e.g., due to FCC considerations), WebRTC/SIP gateway device 110 may package this instance of service data in only the FROM header, as described.

As previously described, WebRTC/SIP gateway device 110 may offer a privacy service pertaining to an instance of service data (e.g., the user's name, etc.). For example, based on a determination that either the service requires a high level of privacy of the service data or the user requests a high level of privacy (e.g., the service allows it), WebRTC/SIP gateway device 110 may generate an anonymous FROM header and a Privacy header (see e.g., RFC 3323). A P-Asserted-ID may be still provided with name and number type service data depending on the level of trustworthiness (e.g., if the level of trustworthiness is high).

The generation of the Privacy header is typically related to whether user identifying information, which is typically the caller's display name and telephone number, is allowed to be delivered and presented by the network to the called party. This setting today is only based on the expressed wishes of the user/calling party. For example, in a time-division multiplexing (TDM)-based phone service, the user/calling party may dial a star code to invoke privacy. The carrier generates the Privacy header in SIP. According to an exemplary embodiment, the privacy service is applied to a WebRTC user, which is not a traditional "subscriber" to which such a service would even apply, and across all or some of the service data pertaining to the WebRTC user and/or the service the WebRTC user is using. In other words, all the service data could have the same rules applied to it as a whole (as indicated by the SIP Privacy header), or some data may be marked independently differently (using a "privacy" tag/marking that goes along with the information) as not all data may have the same expectation nor need of privacy. Also, the determination and marking of privacy may be extended to include not only the user's wishes concerning the user's more direct/typical identity (e.g., telephone number, name, address etc.), but also includes actions by the Webservice being accessed to set, demand, and/or remove the privacy/sensitivity of certain information based on the type of service. This applies to explicit user information the Webservice has received directly from the user, implicit user-related information the Webservice has determined or looked up based on the user information, and service data related to the correlation or association of the user and the service being used. The Webservice may override any user preference to guarantee that the user's identity is protected, or possibly remove the user's preference for privacy because for the given service no expectation of privacy exists (e.g., the user has clicked the "I accept rules" box), or the service by default has the right to receive the information. For example, toll-free services can receive Automatic Number Identification (ANI) information even when the user requests presentation restriction since it is the call center that is paying for the call.

As previously described, WebRTC/SIP gateway device 110 may tokenize an instance of service data. WebRTC/SIP gateway device 110 may determine whether to tokenize service data based on network rules or policies. For example, due to the nature of User-Agent information typically being passed through to SIP endpoints (unless specifically removed by the delivering network/service), which may be an untrusted $3^{rd}$ party, WebRTC/SIP gateway device 110 may tokenize service data by default (i.e., the default setting is to tokenize). By way of example, assume that service data may be carried in the User-Agent header, such as User-Agent: externalpasscode Mozilla5.0 Spanish-USA medical privacy. WebRTC/SIP gateway device 110 may tokenize this data as: User-Agent: E#M500#Ae#LS1#PB. The tokenized data is interpretable only by those platforms and services that are configured to recognize the token format. Any well-known method to tokenize the service data may be implemented.

Network device 115 includes a network device that hosts a WebRTC session or may operate as an intermediary network device for a WebRTC session. According to an exemplary embodiment, network device 115 operates according to the SIP. Network device 115 may be implemented to include a bridge. By way of further example, network device 115 may be implemented to include an audio/video bridge (e.g., a video conferencing bridge), an audio conferencing bridge (e.g., Voice-over-IP), or other suitable WebRTC hosting device that supports a WebRTC session. Alternatively, network device 115 may be implemented to include a gateway or another type of intermediary network device that provides a path towards an end user device.

User device 120 includes a device that supports a WebRTC session. For example, user device 120 includes a web browser or other software that supports a WebRTC session. By way of example, user device 120 may be implemented as a computer (e.g., a desktop computer, a laptop computer, a netbook, a palmtop computer, etc.), or other type of end user device (e.g., an Internet access device, a set top box and a television, a smart television, a vehicular communication system, etc.). User device 120 may include peripheral devices, such as a web cam, a microphone, etc. User device 140 may include a device similar to user device 120.

Figure 2B:
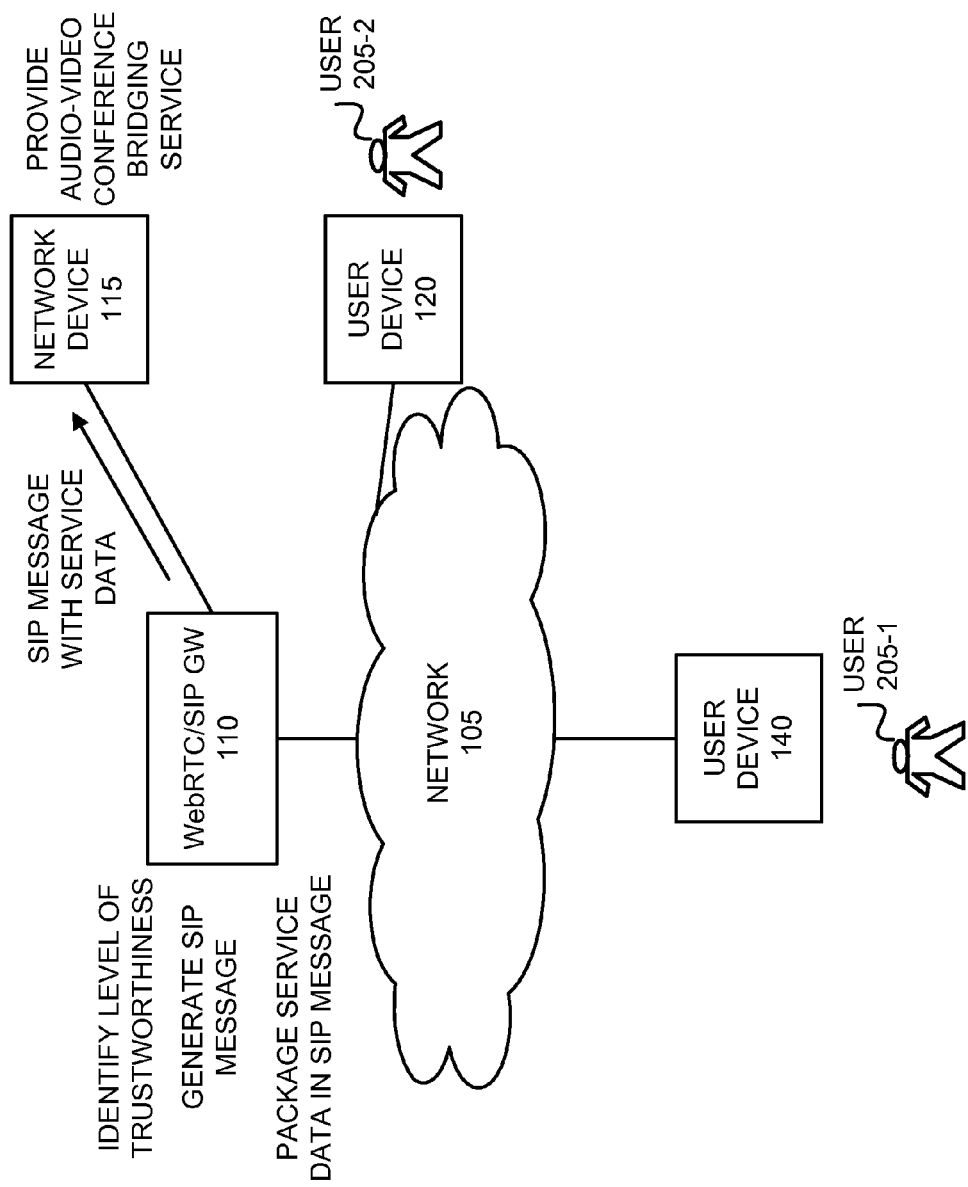

FIGS. 2A-2D are diagrams illustrating exemplary processes pertaining to WebRTC/SIP gateway device 110 and the communication of service data in a carrier-grade network. FIGS. 2A and 2B illustrate an exemplary scenario in which users 205 establish a WebRTC session in the absence of a redirect. Referring to FIG. 2A, assume a user 205-1 decides to use a WebRTC service hosted by network device 115 to establish an audio-video conference with user 205-2. For example, network device 115 is implemented as an audio-video conferencing bridge. User 205-1 accesses network device 115 via WebRTC/SIP gateway device 110. For example, as illustrated, user 205-1 establishes an HTTP(S) connection with WebRTC/SIP gateway device 110 via network 105. WebRTC/SIP gateway device 110 and network device 115 (i.e., the audio-video conferencing bridge) are a part of a carrier-grade network.

As illustrated, WebRTC/SIP gateway device 110 provides a web interface. According to an exemplary implementation, WebRTC/SIP gateway device 110 includes a login user interface. The login user interface may obtain service data (e.g., name, etc.) and/or non-service data (e.g., a password, etc.). According to an exemplary scenario in which account information is stored, WebRTC/SIP gateway device 110 may obtain service data linked to service data and/or non-service data obtained from user 205-1 via the login user interface. According to another exemplary scenario in which account information is not stored and user 205-1 is treated as a temporary or an anonymous user, the login user interface may or may not obtain service data. According to another exemplary implementation, WebRTC/SIP gateway device 110 does not include a login user interface. Additionally, as previously described, WebRTC/SIP gateway device 110 may obtain service data stemming from the web session (e.g., type of browser, etc.).

According to an exemplary implementation, WebRTC/SIP gateway device 110 includes a WebRTC session interface that allows user 205-1 to establish a connection with network device 115. For example, the WebRTC session interface may obtain scheduling information pertaining to an audio-video conference from user 205-1. Additionally, or alternatively, the WebRTC session interface may include a hyperlink to establish a connection with network 115.

Referring to FIG. 2B, WebRTC/SIP gateway device 110 identifies a level of trustworthiness of the service data based on a set of network rules and heuristics prescribed by the WebRTC/SIP service provider, as previously described. WebRTC/SIP gateway device 110 generates a SIP message (e.g., an INVITE message) and packages the service data based on the level of trustworthiness identified for the service data. As previously described, WebRTC/SIP gateway device 110 may assign a level of privacy based on the user 205-1's request and/or the hosting WebRTC device (e.g., network device 115). As further illustrated, WebRTC/SIP gateway device 110 transmits the SIP message, which carries the service data, to network device 115. Based on the received SIP message, network device 115 provides an audio-video conference bridging service.

The service data transmitted via the carrier-grade network may be used by any of the devices illustrated in FIG. 2B. For example, user device 120 may obtain information regarding user 205-1, WebRTC/SIP gateway device 110 may use the service data for statistical and/or marketing purposes, for providing non-SIP service data as well as creating and providing privacy indication in SIP to other network platforms/services and endpoints in 115, and network device 115 may use the service data relating to privacy, service enhancement/personalization, marketing purposes, etc. Additionally, other network devices (not illustrated) may obtain the service data. For example, a billing device may receive the service data for billing purposes. Additionally, user 205-1 may be establishing a WebRTC session with an agent at a call center. The service data may be helpful to the agent. For example, service data may be used to automatically look up the user's account, allow the session to be directed to an agent the user already has a history with, or direct the session to an agent most likely to be able to serve or be related to the user's location, language, service used.

In this regard, a user of an end user device may have some information pertaining to user 205-1 coming from the Internet space.

Figure 2D:
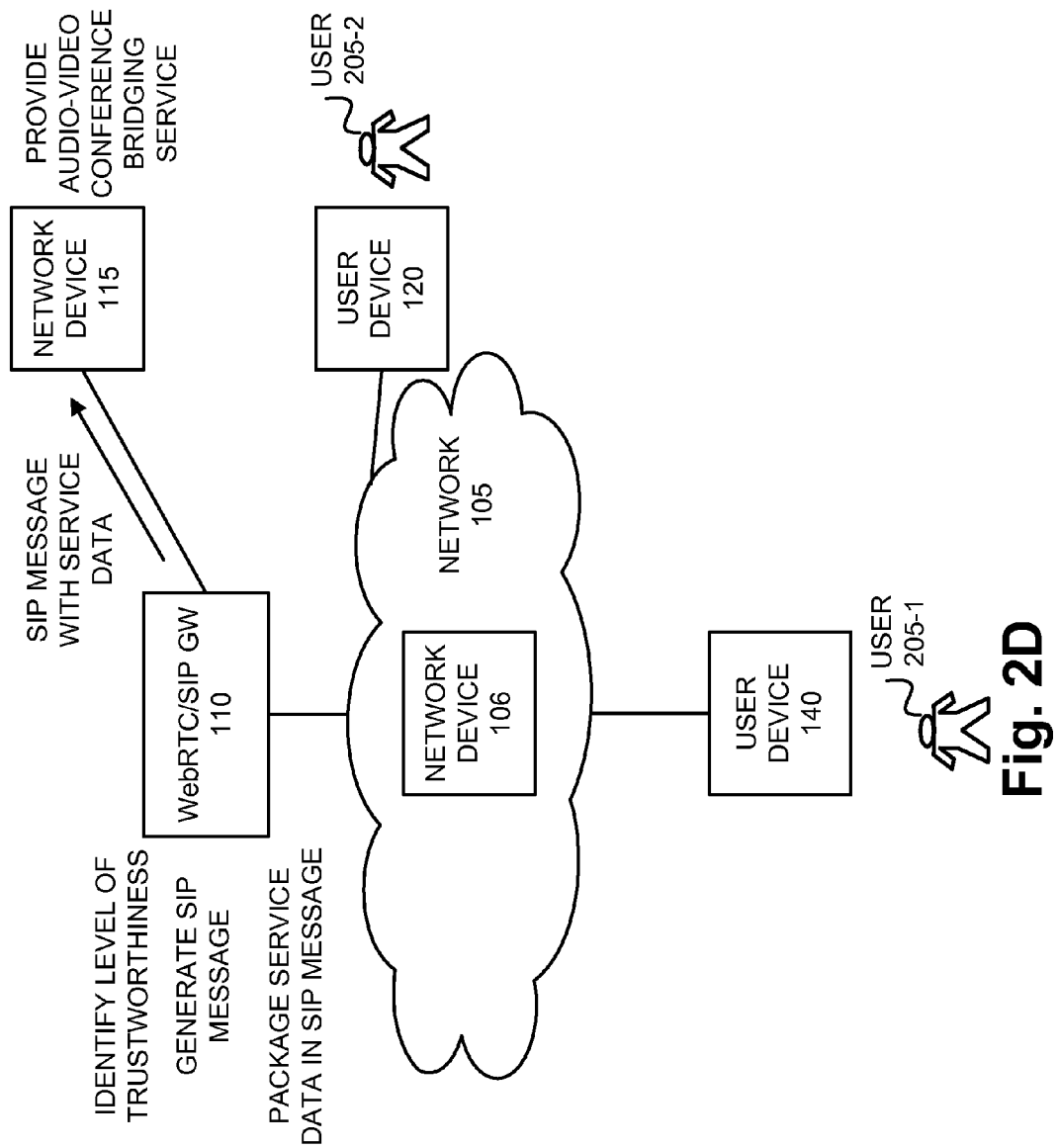

FIGS. 2C and 2D illustrate an exemplary scenario in which users 205 establish a WebRTC session based on a redirect from network device 106. Referring to FIG. 2C, assume user 205-1 decides to establish a WebRTC session with user 205-2 and visits network device 106. For example, as illustrated, user 205-1 establishes an HTTP(S) connection with network device 106. As illustrated, network device 106 provides a web interface. The web interface may prompt user 205-1 for service data. By way of example, assume user 205-1 visited a web site that required user 205-1 to log into his company's health plan account. The web service may then pass information, such as privacy level (e.g., a Health Insurance Portability and Accountability Act (HIPAA) compliance flag) and authentication level (e.g., highest "authenticated—social security number, address, telephone number, employee number, name, etc."). Thereafter, network device 106 redirects user 205-1 to WebRTC/SIP gateway device 110. Network device 106 may provide WebRTC/SIP gateway device 110 with service data (e.g., included in the URI of the redirect) or via a separate message. As further illustrated in FIGS. 2C and 2D, WebRTC/SIP gateway device 110 establishes a web connection with user device 140. The remaining functions of WebRTC/SIP gateway device 110 may follow in a manner similar to that previously described in relation to FIGS. 2A and 2B. For the sake of brevity, a description of these operations will not be repeated.

FIG. 3 is a diagram illustrating exemplary components of a device 300 that may correspond to one or more of the devices in the environments described herein. For example, device 300 may correspond to WebRTC/SIP gateway device 110, user device 140, as well as other devices previously described. As illustrated, according to an exemplary embodiment, device 300 includes a processor 305, memory/storage 310 that stores software 315, a communication interface 320, an input 325, and an output 330. According to other embodiments, device 300 may include fewer components, additional components, different components, and/or a different arrangement of components than those illustrated in FIG. 3 and described herein.

Processor 305 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (e.g., one or multiple cores), microcontrollers, and/or some other type of component that interprets and/or executes instructions and/or data. Processor 305 may be implemented as hardware (e.g., a microprocessor, etc.), a combination of hardware and software (e.g., a SoC, an ASIC, etc.), may include one or multiple memories (e.g., cache, etc.), etc.

Processor 305 may control the overall operation or a portion of operation(s) performed by device 300. Processor 305 may perform one or multiple operations based on an operating system and/or various applications or programs (e.g., software 315). Processor 305 may access instructions from memory/storage 310, from other components of device 300, and/or from a source external to device 300 (e.g., a network, another device, etc.).

Memory/storage 310 includes one or multiple memories and/or one or multiple other types of storage mediums. For example, memory/storage 310 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a phase-change memory (PCM), a dual in-line memory module (DIMM), a flash memory, and/or some other type of memory. Memory/storage 310 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 310 may include drives for reading from and writing to the storage medium.

Memory/storage 310 may be external to and/or removable from device 300, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray® disk (BD), etc.). Memory/storage 310 may store data, software, and/or instructions related to the operation of device 300.

Software 315 includes an application or a computer program that provides a function and/or a process. Software 315 may include firmware. For example, with reference to WebRTC/SIP gateway device 110, software 315 may include an application that, when executed by processor 315, provides the functions of WebRTC/SIP gateway device 110, as described herein.

Communication interface 320 permits device 300 to communicate with other devices, networks, systems, etc. Communication interface 320 may include one or multiple wireless interfaces and/or wired interfaces. Communication interface 320 may include one or multiple transmitters and receivers or transceivers. Communication interface 320 may operate according to a protocol and a communication standard.

Input 325 permits an input into device 300. For example, input 325 may include a keyboard, a mouse, a display, a touchscreen, a touchless screen, a button, a switch, an input port, speech recognition logic, and/or some other type of visual, auditory, tactile, etc., input component. Output 330 permits an output from device 300. For example, output 330 may include a speaker, a display, a touchscreen, a touchless screen, a light, an output port, and/or some other type of visual, auditory, tactile, etc., output component.

Device 300 may perform a process and/or a function, as described herein, in response to processor 305 executing software 315 stored by memory/storage 310. By way of example, instructions may be read into memory/storage 310 from another memory/storage 310 or read from another device via communication interface 320 into memory/storage 310. The instructions stored by memory/storage 310 may cause processor 305 to perform a process described herein. Alternatively, hardwired circuitry may be used in place of or in combination with software instructions to implement processes described herein.

Figure 4A:
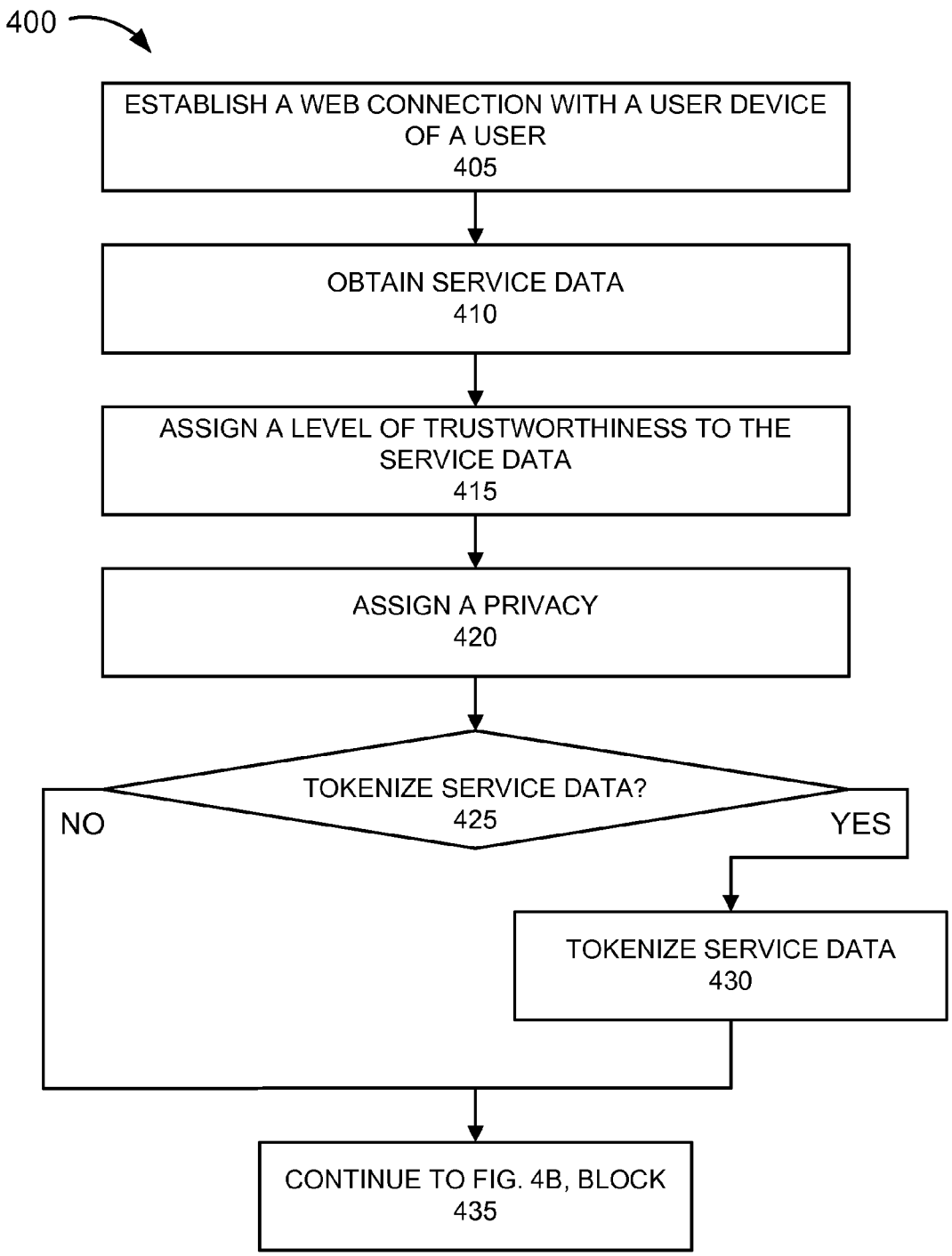
FIGS. 4A and 4B are flow diagrams that illustrate an exemplary process pertaining to the communication of service data in a carrier-grade network pertaining to a WebRTC session.
Figure 4B:
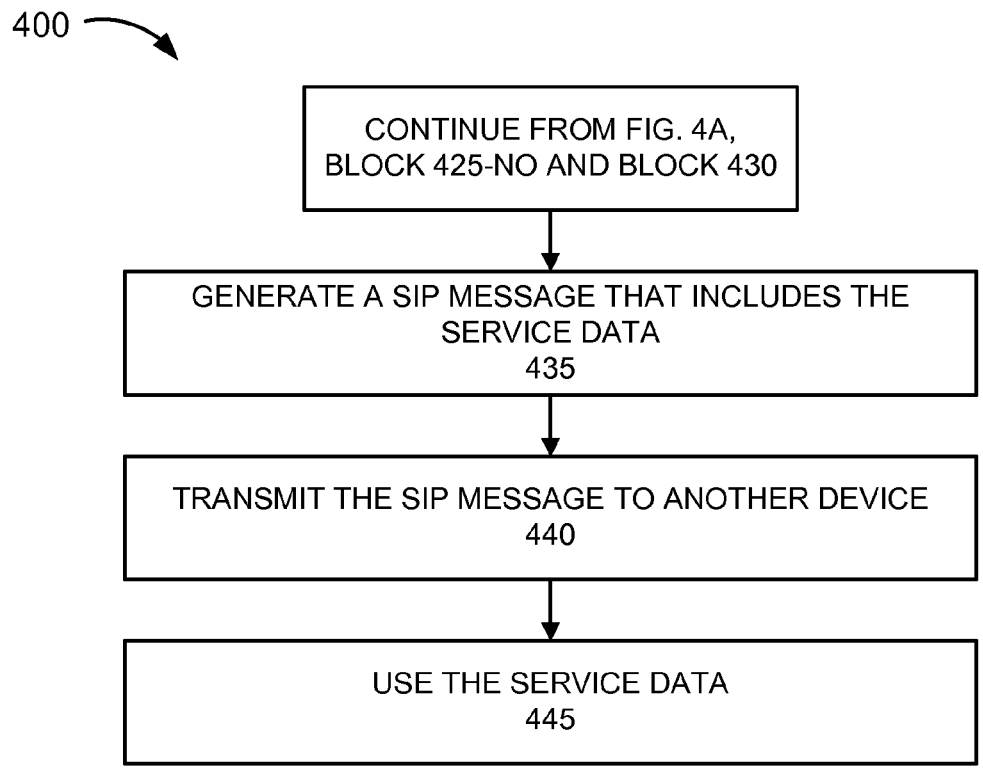

FIGS. 4A and 4B are flow diagrams illustrating an exemplary process 400 pertaining to the communication of service data in a carrier-grade network pertaining to a WebRTC session. Process 400 is directed to a process previously described above with respect to FIGS. 2A-2D and elsewhere in this description, in which WebRTC/SIP gateway device 110 packages service data into a SIP message that supports the establishment, maintenance, and/or termination of a WebRTC session. According to an exemplary embodiment, WebRTC/SIP gateway device 110 performs one or more of the steps described in process 400. For example, processor 305 may execute software 315 to perform the steps described.

Referring to FIG. 4A, process 400 begins, in block 405, with establishing a web connection with a user device of a user. For example, user device 140 connects with WebRTC/SIP gateway device 110 via a web browser. The web browser may be WebRTC-enabled. The user is seeking to establish a WebRTC session via WebRTC/SIP gateway device 110.

In block 410, service data is obtained. For example, WebRTC/SIP gateway device 110 obtains service data in one or multiple ways, as previously described. By way of further example, WebRTC/SIP gateway device 110 obtains service data based on prompting the user for service data, receiving service data from another device (e.g., in a redirect scenario), accessing previously stored service data (e.g., in an account scenario), and/or by virtue of the web connection (e.g., service data included in messages).

In block 415, a level of trustworthiness is assigned to the service data. For example, WebRTC/SIP gateway device 110 assigns a level of trustworthiness to each instance of service data. For example, WebRTC/SIP gateway device 110 assigns the level of trustworthiness based on a set of network rules and heuristics prescribed by the WebRTC/SIP service provider. As an example, WebRTC/SIP gateway device 110 uses a two or three-tiered system. Additionally, as previously described, an indicator of web service verification (e.g., type, method, and/or level of authentication pertaining to service data) may be received by WebRTC/SIP gateway device 110 to assist WebRTC/SIP gateway device 110 in assigning a level of trustworthiness. For example, WebRTC/SIP gateway device 110 may receive an authentication indicator (e.g., "authenticated" user's telephone number, "authenticated "user's address" or "location", or any other instance of service data).

In block 420, privacy is assigned. For example, WebRTC/SIP gateway device 110 receives a request, from the user, to remain anonymous in relation to a WebRTC session. For example, the user may be presented with an option to restrict use of identity information of the user. Alternatively, the web service by which a WebRTC session is hosted allows for a privacy setting.

In block 425, it is determined whether to tokenize the service data. For example, WebRTC/SIP gateway device 110 determines whether to tokenize an instance of service data based on various factors, such as, as whether the downstream party (e.g., party hosting the WebRTC session) is a trusted third party, the type of service data (e.g., name versus type of web browser), and/or other types of network rules or policies.

If it is determined not to tokenize the service data (block 425—NO), then process 400 continues to block 435 of FIG. 4B. If it is determined to tokenize the service data (block 425—YES), the service data is tokenized (block 430). WebRTC/SIP gateway device 110 tokenizes one or multiple instances of service data using a well-known method for tokenizing data.

Referring to FIG. 4B, in block 435, a SIP message is generated that includes the service data. For example, WebRTC/SIP gateway device 110 generates a SIP message. WebRTC/SIP gateway devices 110 inserts the service data (tokenized or not) into appropriate portions of the SIP message, as previously described. For example, WebRTC/SIP gateway device 110 may package the service data into an existing SIP header (e.g., User-Agent header, etc.) or a proprietary header.

In block 440, the SIP message is transmitted to another device. For example, WebRTC/SIP gateway device 110 transmits the SIP message to a SIP device (e.g., network device 115 or network device 106). A WebRTC session may be initiated based on the SIP message.

In block 445, the service data is used. For example, the service data may be displayed to a user of an end user device (e.g., user device 120). Additionally, or alternatively, the service data may be used by WebRTC/SIP gateway device 110 for statistical and/or marketing purposes (e.g., pushing an advertisement, etc.), or other network devices (e.g., network device 115, network device 106).

Although FIGS. 4A and 4B illustrate an exemplary prioritized blocking process 400, according to other embodiments, process 400 may include additional operations, fewer operations, and/or different operations than those illustrated in FIGS. 4A and 4B described herein.

The foregoing description of embodiments provides illustration, but is not intended to be exhaustive or to limit the embodiments to the precise form disclosed. Accordingly, modifications to the embodiments described herein may be possible.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while series of blocks have been described with regard to the process illustrated in FIGS. 4A and 4B, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software and/or firmware executed by hardware. For example, a process or a function may be implemented as "logic" or as a "component." The logic or the component may include, for example, hardware (e.g., processor 305, etc.), or a combination of hardware and software (e.g., software 315). The embodiments have been described without reference to the specific software code since the software code can be designed to implement the embodiments based on the description herein and commercially available software design environments/languages.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

To the extent the aforementioned embodiments collect, store or use personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Additionally, embodiments described herein may be implemented as a non-transitory storage medium that stores data and/or information, such as instructions, program code, data structures, program modules, an application, etc. A non-transitory storage medium includes one or more of the storage mediums described in relation to memory/storage 310.

No element, act, or instruction described in the present application should be construed as critical or essential to the embodiments described herein unless explicitly described as such.

What is claimed is:

1. A method comprising:
    establishing, by a network device, a web connection with an anonymous user of a user device via a Web Real Time Communication (WebRTC) browser of the user device that operates according to a WebRTC standard that enables browser-to-browser voice calling, video chat, and peer-to-peer file sharing, and wherein the network device provides access to a carrier-grade network in support of a WebRTC session;
    obtaining, by the network device, one or more instances of service data that includes a user identifier pertaining to the anonymous user of the user device;
    assigning, by the network device, a level of trustworthiness from among multiple levels of trustworthiness to each instance of the service data, wherein a selection of the level of trustworthiness is based on a source from where each instance of the service data is obtained and a type of each instance of the service data;
    generating, by the network device, a Session Initiation Protocol (SIP) message that includes a request to initiate the WebRTC session;
    packaging, by the network device, each instance of the service data in a field of the SIP message, wherein the user identifier of the anonymous user is packaged in a header field having a same level of trustworthiness as the level of trustworthiness assigned to the corresponding instance of service data; and
    transmitting, by the network device, the SIP message to another device that provides a WebRTC service.

2. The method of claim 1, wherein the one or more instances of the service data includes a uniform resource identifier (URI) of a network device from which the anonymous user of the user device previously visited and an expectation of user privacy indicator, which is selected by the anonymous user, and wherein the URI is packaged in a Call-Info header of the SIP message and the expectation of user privacy indicator is packaged in the header field.

3. The method of claim 1, further comprising:
    determining whether to tokenize the one or more instances of the service data based on network rules;
    tokenizing at least one of the one or more instances of the service data based on the determining; and wherein the packaging further comprises:
    packaging the at least one of the one or more instances of tokenized service data in a User-Agent header, wherein the at least one of the one or more instances of tokenized service data includes characteristic data of the user device.

4. The method of claim 3, wherein the packaging further comprises:
    using the characteristic data of the user device as a basis to select advertisements on behalf of the anonymous user.

5. The method of claim 1, wherein the packaging further comprises:
    selecting each field to use to carry each instance of the service data based on a determination that the one or more instances of the service data are authenticated or verified; and
    displaying the one or more instances of the service data via another user device during the WebRTC session.

6. The method of claim 1, wherein the packaging of each instance of the service data in the SIP message comprises:
    determining whether at least one of the one or more instances of the service data indicates an identity of the anonymous user;
    determining whether the at least one of the one or more instances of the service data is authenticated or verified in response to determining that the at least one of the one or more instances of the service data indicates the identity of the anonymous user;
    selecting a P-Asserted-ID header to package the at least one of the one or more instances of the service data in response to determining that the at least one of the one or more instances of the service data is authenticated or verified; and
    packaging the at least one of the one or more instances of the service data in the P-Asserted-ID header, wherein the at least one of the one or more instances of the service data includes the user identifier.

7. The method of claim 1, wherein the packaging of each instance of the service data in the SIP message comprises:
    identifying that a privacy setting directed to a blocking of an identity of the anonymous user is requested by the anonymous user or afforded based on a web service associated with the WebRTC session; and
    generating an anonymous FROM header and a PRIVACY header in response to the identifying, wherein the anonymous FROM header is the header field.

8. The method of claim 1, wherein the other device includes a Session Initiation Protocol (SIP) device, the method further comprising:
    prompting the anonymous user, via a web user interface, for at least one of the one or more instances of the service data;
    receiving the at least one of the one or more instances of the service data in response to the prompting; and
    providing a communication session in support of the WebRTC session.

9. A network device comprising:
    a communication interface;
    a memory, wherein the memory stores instructions; and
    a processor, wherein the processor executes the instructions to:
    establish, via the communication interface, a web connection with an anonymous user of a user device via a Web Real Time Communication (WebRTC)

browser of the user device that operates according to a WebRTC standard that enables browser-to-browser voice calling, video chat, and peer-to-peer file sharing, and wherein the network device provides access to a carrier-grade network in support of a WebRTC session;

obtain one or more instances of service data that includes a user identifier pertaining to the anonymous user of the user device;

assign a level of trustworthiness from among multiple levels of trustworthiness to each instance of the service data, wherein a selection of the level of trustworthiness is based on a source from where each instance of the service data is obtained and a type of each instance of the service data;

generate a Session Initiation Protocol (SIP) message that includes a request to initiate the WebRTC session;

package each instance of the service data in the SIP message, wherein the user identifier of the anonymous user is packaged in a header field having a same level of trustworthiness as the level of trustworthiness assigned to the corresponding instance of service data; and transmit, via the communication interface, the SIP message to another device that provides a WebRTC service.

10. The network device of claim 9, wherein the network device comprises a WebRTC-to-Session Initiation Protocol gateway device, and wherein the one or more instances of the service data includes a uniform resource identifier (URI) of a network device from which the anonymous user of the user device previously visited and an expectation of user privacy indicator, which is selected by the anonymous user, and wherein the URI is packaged in a Call-Info header of the SIP message and the expectation of user privacy indicator is packaged in the header field.

11. The network device of claim 9, wherein the processor further executes the instructions to:

determine whether to tokenize the one or more instances of the service data based on the type of each instance of the service data and network rules;

tokenize at least one of the one or more instances of the service data based on a determination to tokenize; and wherein, when packaging, the processor further executes the instructions to:

package the at least one of the one or more instances of tokenized service data in a User-Agent header, wherein the at least one of the one or more instances of tokenized service data includes characteristic data of the user device.

12. The network device of claim 9, wherein the processor further executes the instructions to:

identify that a privacy setting directed to a blocking of an identity of the anonymous user is requested by the anonymous user or afforded based on a web service associated with the WebRTC session; and generate an anonymous FROM header and a PRIVACY header in response to the identification of the privacy setting, wherein the anonymous FROM header is the header field.

13. The network device of claim 9, wherein, when packaging each instance of the service data, the processor further executes the instructions to:

select each field to use to carry each instance of the service data based on the type of each instance of the service data.

14. The network device of claim 9, wherein, when packaging each instance of the service data, the processor further executes the instructions to:

select each field to use to carry each instance of the service data based on a determination that the one or more instances of the service data are authenticated or verified.

15. The network device of claim 9, wherein, when packaging each instance of the service data in the SIP message, the processor further executes the instructions to:

determine whether at least one of the one or more instances of the service data indicates an identity of the anonymous user;

determine whether the at least one of the one or more instances of the service data is authenticated or verified in response to a determination that the at least one of the one or more instances of the service data indicates the identity of the anonymous user;

select a P-Asserted-ID header to package the at least one of the one or more instances of the service data in response to a determination that the at least one of the one or more instances of the service data is authenticated or verified; and package the at least one of the one or more instances of the service data in the P-Asserted-ID header, wherein the at least one of the one or more instances of the service data includes the user identifier.

16. A non-transitory storage medium storing instructions executable by a computational device to:

establish a web connection with an anonymous of a user device via a Web Real Time Communication (WebRTC) browser of the user device that operates according to a WebRTC standard that enables browser-to-browser voice calling, video chat, and peer-to-peer file sharing, and wherein the computational device provides access to a carrier-grade network in support of a WebRTC session;

obtain one or more instances of service data that includes a user identifier pertaining to the anonymous user of the user device;

assign a level of trustworthiness from among multiple levels of trustworthiness to each instance of the service data, wherein a selection of the level of trustworthiness is based on a source from where each instance of the service data is obtained and a type of each instance of the service data;

generate a message that includes a request to initiate the WebRTC session;

package each instance of the service data in the SIP message, wherein the user identifier of the anonymous user is packaged in a header field having a same level of trustworthiness as the level of trustworthiness assigned to the corresponding instance of service data; and transmit the SIP message to another device that provides a WebRTC service.

17. The non-transitory storage medium of claim 16, further storing instructions executable by the computational device to:

select each field to use to carry each instance of the service data based on a determination that the one or more instances of the service data are authenticated or verified.

18. The non-transitory storage medium of claim 16, further storing instructions executable by the computational device to:

determine whether at least one of the one or more instances of the service data indicates an identity of the anonymous user;

determine whether the at least one of the one or more instances of the service data is authenticated or verified in response to a determination that the at least one of the one or more instances of the service data indicates the identity of the anonymous user;

select a P-Asserted-ID header to package the at least one of the one or more instances of the service data in response to a determination that the at least one of the one or more instances of the service data is authenticated or verified; and package the at least one of the one or more instances of the service data in the P-Asserted-ID header, wherein the at least one of the one or more instances of the service data includes the user identifier.

19. The non-transitory storage medium of claim 16, further storing instructions executable by the computational device to:

identify that a privacy setting directed to a blocking of an identity of the anonymous user is requested by the anonymous user or afforded based on a web service associated with the WebRTC session; and generate an anonymous FROM header and a PRIVACY header in response to the identification of the privacy setting, wherein the anonymous FROM header is the header field.

20. The non-transitory storage medium of claim 16, wherein the one or more instances of the service data includes a uniform resource identifier (URI) of a network device from which the anonymous user of the user device previously visited and an expectation of user privacy indicator, which is selected by the anonymous user, and wherein the URI is packaged in a Call-Info header of the SIP message and the expectation of user privacy indicator is packaged in the header field.

21. A method comprising:

establishing, by a network device, a web connection with an anonymous user of a user device via a Web Real Time Communication (WebRTC) browser of the user device that operates according to a WebRTC standard that enables browser-to-browser voice calling, video chat, and peer-to-peer file sharing, and wherein the network device provides access to a carrier-grade network in support of a WebRTC session;

obtaining, by the network device, one or more instances of service data that includes a user identifier pertaining to the anonymous user of the user device;

assigning, by the network device, a level of trustworthiness from among multiple levels of trustworthiness to each instance of the service data, wherein a selection of the level of trustworthiness is based on a source from where each instance of the service data is obtained and a type of service data;

generating, by the network device, a message that includes a request to initiate the WebRTC session;

packaging, by the network device, each instance of the service data in the message, wherein the user identifier of the anonymous user is packaged in a header field having a same level of trustworthiness as the level of trustworthiness assigned to the corresponding instance of service data; and transmitting, by the network device, the message to another device that provides a WebRTC service.

22. The method of claim 21, wherein the message includes a Session Initiation Protocol (SIP) message, and wherein a SIP User-Agent header includes characteristic data pertaining to the user device, and wherein the one or more instances of the service data includes an expectation of user privacy indicator, which is selected by the anonymous user, that indicates a particular level of privacy from among multiple levels of privacy.

23. The method of claim 21, wherein the message includes a Session Initiation Protocol (SIP) message, and wherein the one or more instances of the service data includes a calling party name and number pertaining to the anonymous user and the calling party name and number is packaged in one of a P-Asserted-Identity header, a Remote-Party-ID header, or a FROM header.

24. The method of claim 21, wherein the message includes a Session Initiation Protocol (SIP) message, and wherein the one or more instances of the service data includes an address of an intermediary device from which the anonymous user of the user device accessed to establish the web connection, and wherein the address is packaged in a Call-Info header as a uniform resource identifier.

25. The method of claim 21, wherein the other device includes a Session Initiation Protocol (SIP) device and comprises a bridge device that supports the WebRTC session.

* * * * *